(12) United States Patent
Kerby

(10) Patent No.: US 7,145,675 B2
(45) Date of Patent: Dec. 5, 2006

(54) HUMIDITY-BASED PRINTER SYSTEM CONTROL

(75) Inventor: George H. Kerby, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 09/760,964

(22) Filed: Jan. 16, 2001

(65) Prior Publication Data

US 2002/0093687 A1 Jul. 18, 2002

(51) Int. Cl.
*G06F 15/00* (2006.01)
(52) U.S. Cl. ............... 358/1.15; 358/3.13; 358/3.14; 347/17; 347/188; 347/189; 347/191; 399/23; 399/24; 399/27; 399/44
(58) Field of Classification Search ............... 358/1.15, 358/3.14, 3.13; 399/44, 61, 97, 114, 119, 399/120, 262, 23, 24, 27, 53, 69, 91; 347/17, 347/188, 189, 191, 214
See application file for complete search history.

(56) References Cited

U.S. PATENT DOCUMENTS 5,237,369 A * 8/1993 Maruta et al. ............... 399/49
5,539,500 A * 7/1996 Hamamichi et al. .......... 399/97
5,655,174 A * 8/1997 Hirst ............................ 399/27
5,913,097 A * 6/1999 Nakano et al. ............. 399/256
6,073,480 A * 6/2000 Gokhfeld .................... 73/29.02
6,100,996 A * 8/2000 Amano et al. ............... 358/1.9
6,268,094 B1 * 7/2001 Allen et al. .................. 430/30
6,708,279 B1 * 3/2004 Takenaka .................... 713/324

OTHER PUBLICATIONS

American Heritage College Dictionary, Fourth Edition, 2002, Houghton Mifflin Company, p. 1159.*

* cited by examiner

*Primary Examiner*—Mark Zimmerman
*Assistant Examiner*—Vincent M. Rudolph

(57) ABSTRACT

A printer system comprises a communication interface and printer components. The communication interface receives a humidity value from a toner cartridge. The printer components control printing operation based on the humidity value. To control printing operation, the printer components may configure a dither matrix based on the humidity value. The toner cartridge comprises a humidity sensor and a communication interface. The humidity sensor detects a humidity level and generates the humidity value to correspond to the humidity level. The communication interface transfers the humidity value from the humidity sensor to the printer system.

19 Claims, 4 Drawing Sheets

HUMIDITY-BASED PRINTER SYSTEM CONTROL

BACKGROUND OF THE INVENTION

1. Field of the Invention

The invention is related to the field of printer systems, and in particular, to a printer system and toner cartridge that provide humidity-based control over printing operations.

2. Statement of the Problem

Printer systems include copiers, computer peripherals, network devices, and other devices that produce copies of desired materials. The quality of the copies are adversely affected by humidity variation. Unfortunately, the initial configuration of the printer system may not be optimized for the actual humidity levels that are experienced in the field.

Some advanced color printer systems include internal humidity sensors that periodically detect humidity levels to control printer operation. Typically, the printer system reconfigures its engine characteristics based on the humidity levels. Unfortunately, this type of humidity control requires internal humidity sensors that are only available in advanced color systems. Humidity control is not available in monochrome systems.

Printer systems use pixels to represent the desired materials. The pixels have pixel values that specify the shading for a small area of the resulting copy. The pixel values may be eight-bit codes. The printer system may scan physical material or process an electromagnetic signal to generate the pixel values. Printer systems use dither matrices to modify pixel values before producing the copies. Some printer systems periodically adjust the dither matrices based on toner development measurements. Unfortunately, these printer systems do not adjust the dither matrices based solely on humidity.

SUMMARY OF THE SOLUTION

The invention helps solve the above problems with a printer system and toner cartridge that provide humidity control in both color and monochrome systems. Advantageously, the printer system adjusts the dither matrices based on humidity to improve copy quality. The humidity control may be exerted in real-time to provide continuous quality control. The printer system does not require internal humidity sensors.

Some examples of the invention include a printer system comprising a communication interface and printer components. The communication interface receives a humidity value from a toner cartridge. The printer components control printing operation based on the humidity value. The printer components may determine a humidity range corresponding to the humidity value. If the humidity value is not available, the printer components may use a default value. The printer components may provide humidity-based control in real-time and produce monochrome copies.

To control printing operation, the printer components may configure a dither matrix based on the humidity value. To configure the dither matrix, the printer components may select the dither matrix from a plurality of dither matrices based on the humidity value. To configure the dither matrix, the printer components may scale the dither matrix by applying the humidity value to a response curve.

Some examples of the invention include the toner cartridge comprising toner, a humidity sensor, and a communication interface. The toner is for the printer system. The humidity sensor detects a humidity level and generates a humidity value that corresponds to the humidity level. The humidity sensor may generate the humidity value to correspond to a humidity range for the humidity level where the humidity range is low, medium, or high. The communication interface transfers the humidity value from the humidity sensor to the printer system.

DESCRIPTION OF THE DRAWINGS

The same reference number represents the same element on all drawings.

DETAILED DESCRIPTION OF THE INVENTION

Figure 1:
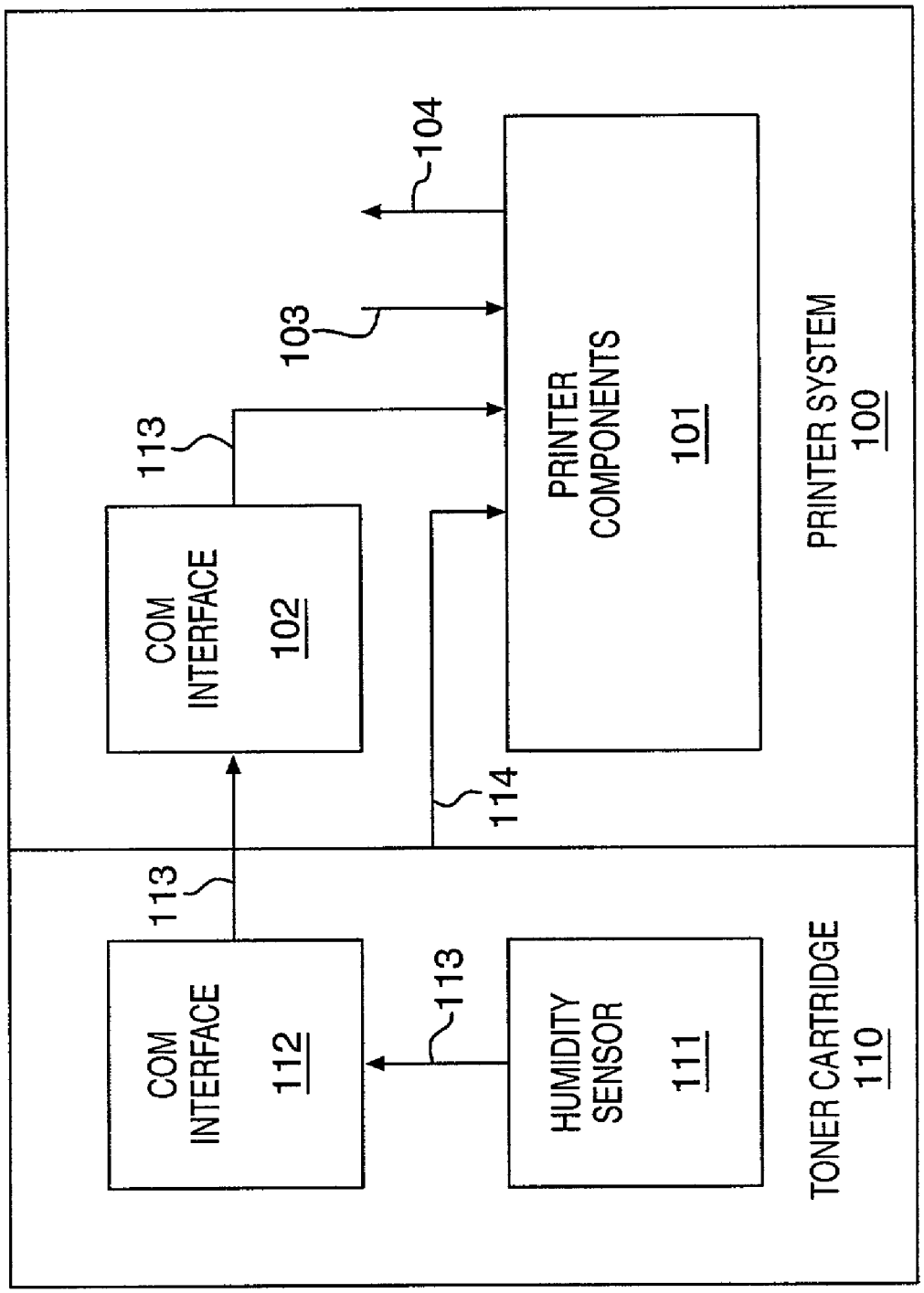
FIG. 1 is a block diagram that illustrates a printer system and toner cartridge in an example of the invention.
Figure 2:
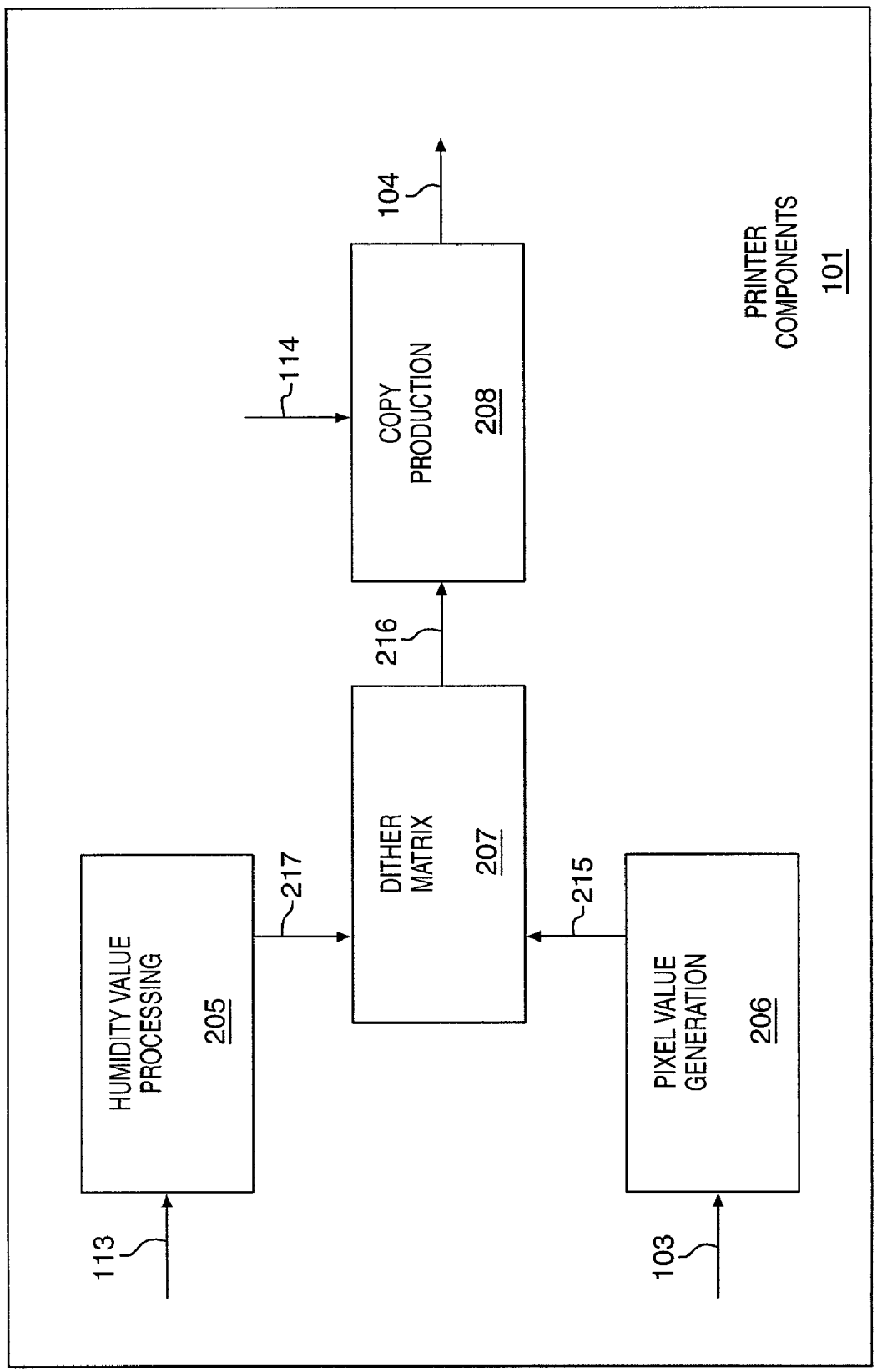
FIG. 2 is a block diagram that illustrates printer components in an example of the invention.

Printer System and Toner Cartridge—FIGS. 1–2

FIG. 1 is a block diagram that illustrates printer system 100 and toner cartridge 110 in an example of the invention. Toner cartridge 110 is coupled to printer system 100. Printer system 100 is comprised of printer components 101 and communication interface 102. Printer components 101 are coupled to communication interface 102. Toner cartridge 110 is comprised of humidity sensor 111 and communication interface 112. Humidity sensor 111 is coupled to communication interface 112.

Toner cartridge 110 contains toner and provides toner 114 to printer components 101 for use in printing operations. Toner cartridge is manually inserted into printer system 100. When toner cartridge 110 runs low on toner, it is manually removed and replaced with a full toner cartridge. Aside from modifications for humidity sensing and communication, toner cartridge 110 could be comprised of conventional components. Toner cartridge 110 could be readily adapted from toner devices that are known in the art.

Humidity sensor 111 detects the humidity level in the surrounding environment and generates humidity value 113 that corresponds to the detected humidity level. Humidity sensor 111 transfers humidity value 113 to communication interface 112. Humidity value 113 could be a humidity percentage or range of percentages. Different humidity ranges could be used as desired. One example of humidity ranges are low, medium, and high where low is 0–25%, medium is 26%–60%, and high is 61% to 100%. If the humidity ranges are specified by four, five, or six bits, then there can be respectively 16, 32, or 64 different humidity ranges. Humidity sensor 111 could be a conventional component.

Communication interfaces 102 and 112 are comprised of components that transfer humidity value 113 from humidity sensor 111 to printer components 101. Communication interface 112 could be an ISO standard, low-power, short-range transmitter, and communication interface 102 could be an ISO standard, low-power, short-range receiver. Communication interfaces 102 and 112 become operational when toner cartridge is coupled to printer system 100.

Printer components 101 receive a representation 103 of the desired material and produce a copy 104 of the desired material using toner 114. Printer components 101 improve print quality by controlling print operations based on humidity value 113. Aside from modifications for humidity-based control, printer system 100 could be comprised of conventional components. Printer system 100 could be readily adapted from printer devices that are known in the art, such as the Laser Jet printers supplied by Hewlett-Packard.

Printer components 101 may include a processor that retrieves and executes instructions that are stored on storage media. Some examples of instructions are software and firmware. Some examples of storage media are memory devices, tape, disks, integrated circuits, and servers. When executed by the processor, the instructions direct the processor to operate printer system 100 in accord with the invention. The term "processor" refers to a single processing device or a group of inter-operational processing devices. Some examples of processors are computers, integrated circuits, and logic circuitry. Those skilled in the art are familiar with instructions, processors, and storage media.

FIG. 2 is a block diagram that illustrates printer components 101 in an example of the invention. Printer components 101 include humidity value processing 205, pixel value generation 206, dither matrix 207, and copy production 208. Pixel value generation 206 receives representation 103 of the desired materials. Copy production 208 produces copy 104 of the desired materials. Humidity value processing 205 receives humidity value 113.

Based on representation 103, pixel value generation 206 generates pixel values 215 for the desired materials. Pixel values 215 specify the shading for a small area of copy 104. The pixel values 215 may be eight-bit codes. If representation 103 is physical material, pixel value generation 206 may scan the material to generate pixel values 215. If representation 103 is an electromagnetic signal, pixel value generation 206 may electronically process the signal to generate pixel values 215. Pixel values 215 may even be received from an external source eliminating the need for pixel value generation 206.

In some examples of the invention, printer components 101 produce a monochrome copy 104 where pixel values 215 only control the shading of a single color scheme, such as white-gray-black. In other examples of the invention, printer components 101 produce a color copy 104 where pixel values 215 control the shading of a multiple color schemes. The remaining description assumes monochrome operation, but those skilled in the art will appreciate how the description could be readily applied to color operation.

Dither matrix 207 receives and processes pixel values 215 to generate adjusted pixel values 216. Dither matrix 207 includes thresholds for pixel values 215. Dither matrix 207 may turn individual pixels off if their corresponding value equals or exceeds the threshold; or alternatively, dither matrix 207 may turn individual pixels off if their corresponding value is less than the threshold.

Copy production 208 receives toner 114 from the toner cartridge. Copy production receives adjusted pixel values 216. Copy production uses toner 114 to produce copy 104 based on adjusted pixel values 216. Ideally, copy 104 is a high-quality depiction of representation 103.

Humidity value processing 205 receives and processes humidity value 113 to configure dither matrix 207 with configuration signal 217. Humidity value processing 205 may use humidity value 113 to select one of multiple possible dither matrices. For example, three possible dither matrices may be available—one for low humidity, one for medium humidity, and one for high humidity. Humidity value processing would select dither matrix 207 from these possibilities based on the humidity indicated by humidity value 113. To optimize print quality, empirical measurements could be taken to correlate humidity ranges with their optimal dither matrices.

Alternatively, humidity value processing 205 may use humidity value 113 to control the values in a master version of dither matrix 207. In this case, humidity value processing 205 applies humidity value 113 to a response curve to determine values for dither matrix 207. To optimize print quality, empirical measurements could be taken to correlate humidity ranges to optimal matrix values, and the correlation would be implemented by the response curve. It may be desirable to use 16, 32, or 64 humidity ranges if a master matrix and response curve are used.

Figure 3:
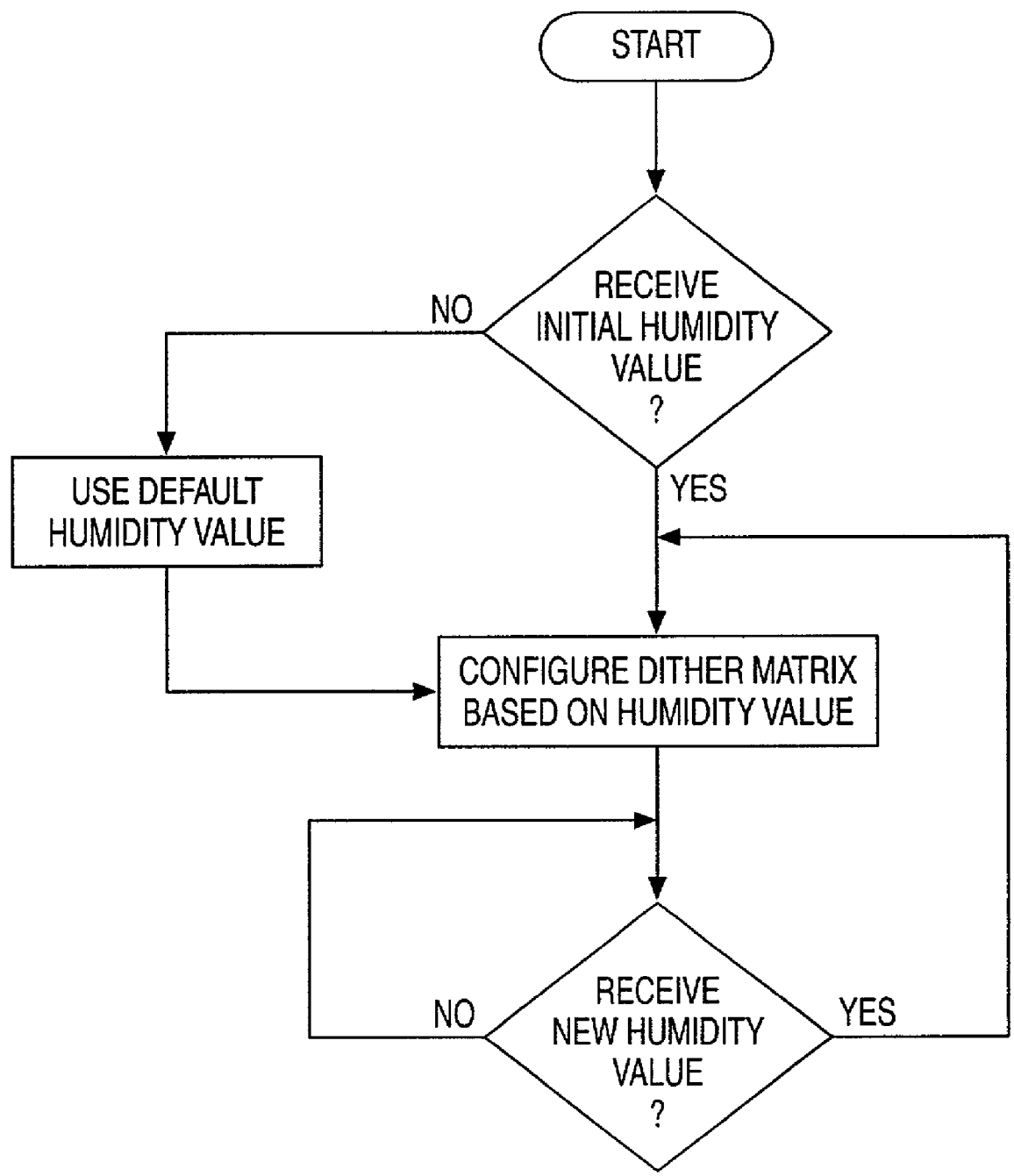
FIG. 3 is a flow diagram that illustrates printer system operation in an example of the invention.
Figure 4:
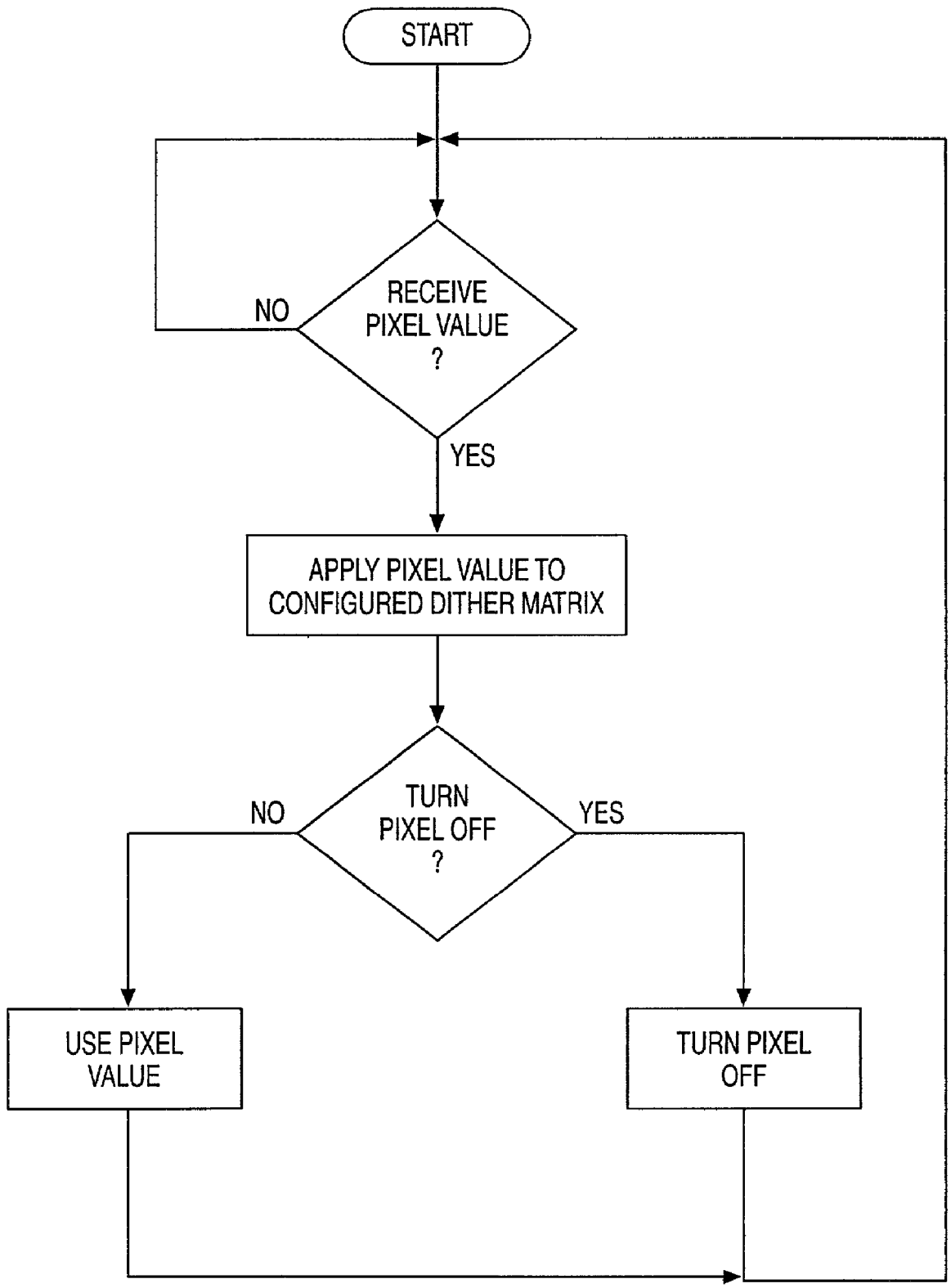
FIG. 4 is a flow diagram that illustrates printer system operation in an example of the invention.

Printer System Operation—FIGS. 3–4

FIG. 3 is a flow diagram that illustrates printer system operation in an example of the invention. If the printer system receives an initial humidity value from the toner cartridge, then the initial humidity value is used to configure the dither matrix. If the printer system does not receive an initial humidity value from the toner cartridge, then a default humidity value that was pre-configured into the printer system is used to configure the dither matrix. Thus, the printer system 100 remains operational if the toner cartridge cannot provide humidity values. Once the dither matrix is initially configured, it is re-configured as new humidity values are received.

Reconfiguration of the dither matrix could occur periodically or in real-time. In a real-time scenario, the toner cartridge and printer system operate continually when powered-up to dynamically re-configure the dither matrix in real-time response to humidity changes. Humidity ranges can be used to reduce the amount of real-time re-configuration. The dither matrix could also be re-configured after a set time period or after a set number of copies or power cycles—and then only if the humidity value has changed appreciably to warrant re-configuration.

FIG. 4 is a flow diagram that illustrates printer system operation in an example of the invention. When a pixel value is received, it is applied to the dither matrix that was configured in FIG. 3. The pixel value is either turned on or off based on a threshold in the dither matrix. If the pixel value is turned on, it is represented on the copy by toner. If the pixel value is turned off, it is not used.

FIGS. 1–3 and the above description depict a specific example of a printer system and toner cartridge in accord with the present invention. Those skilled in the art will appreciate that some conventional aspects of the printer system have been simplified or omitted for clarity. Those skilled in the art will appreciate that the features described above could be combined in various ways to form multiple variations of the invention. Those skilled in the art will also appreciate variations of the printer system and toner cartridge that fall within the scope of the invention. As a result, the invention is not limited to the specific example described above, but only by the following claims and their equivalents.

What is claimed is:

1. A printer system comprising:
  a first transmitter communication interface configured to receive a humidity value from a toner cartridge, wherein the toner cartridge is comprised of a humidity sensor and a second transmitter communication interface; and
  printer components configured to electronically control a printing operation based on the humidity value.

2. The printer system of claim 1 wherein the toner cartridge is configured for coupling to the printer system and wherein:
the humidity sensor is configured to detect a humidity level and generate the humidity value to correspond with humidity level; and
the second transmitter communication interface Is configured to transfer the humidity value from the humidity sensor to the first transmitter communication interface.

3. The printer system of claim 1 wherein the printer components are configured to configure a dither matrix based on the humidity value.

4. The printer system of claim 3 wherein the printer components are configured to select the dither matrix from a plurality of dither matrices based on the humidity value.

5. The printer system of claim 3 wherein the printer components are configured to scale the dither matrix by applying the humidity value to a response curve.

6. The printer system of claim 1 wherein the printer components are configured to determine a humidity range corresponding to the humidity value.

7. The printer system of claim 1 wherein:
the first transmitter communication interface is configured to receive the humidity value from the toner cartridge in real-time; and
the printer components configured to electronically control printing operation based on the humidity value in real-time.

8. The printer system of claim 1 wherein the printer components are configured to produce monochrome copies.

9. A method of operating a printer system, the method comprising:
receiving a humidity value front a toner cartridge, wherein the toner cartridge is comprised of a humidity sensor and a transmitter communication interface;
electronically controlling printing operation based on the humidity value; and
reconfiguring printer components if the humidity value has changed alter at least one of:
a set number of copies; and a set number of power cycles.

10. The method of claim 9 further comprising, in the toner cartridge: detecting a humidity level; generating the humidity value to correspond with the humidity level; and transferring the humidity value from loner cartridge to the printer system.

11. The method of claim 9 wherein controlling the printing operation based on the humidity value comprises configuring a dither matrix based on the humidity value.

12. The method of claim 11 wherein configuring the dither matrix based on me humidity value comprises selecting the dither matrix from a plurality of dither matrices based on the humidity value.

13. The method of claim 11 wherein configuring the dither matrix based on the humidity value comprises applying the humidity value to a response to curve to scale the dither matrix.

14. The method of claim 9 wherein controlling the printing operation based on the humidity value comprises using a default value if the humidity value is not available.

15. The method of claim 9 wherein controlling the printing operation based on the humidity value comprises determining a humidity range corresponding to the humidity value.

16. The method of claim 9 wherein:
receiving the humidity value from the toner cartridge comprises receiving the humidity value from the toner cartridge in real-time; and
electronically controlling the printing operation based on the humidity value comprises controlling the printing operation based on the humidity value in real-time.

17. The method of claim 9 wherein controlling the printing operation based on the humidity value comprises producing monochrome copies.

18. A toner cartridge comprising:
toner for a printer system;
a humidity sensor configured to detect a humidity level and generate a humidity value that corresponds to the humidity level; and
a transmitter communication interface configured to transfer the humidity value from the humidity sensor to the printer system to electronically control a printing operation.

19. The toner cartridge of claim 18 wherein the humidity sensor is configured to generate the humidity value to correspond to a humidity range for the humidity level.

* * * * *